United States Patent
Tschudi

[19]

[11] Patent Number: 6,020,594
[45] Date of Patent: Feb. 1, 2000

[54] BALLISTIC VELOCITY MEASUREMENT SYSTEM HAVING DUAL SENSOR UNIT WITH PARABOLIC SLIT MIRRORS

[76] Inventor: Dennis E. Tschudi, 3044 Twincreek Ave., Palmdale, Calif. 93551

[21] Appl. No.: 09/118,443

[22] Filed: Jul. 17, 1998

[51] Int. Cl.[7] .................................................. G01N 21/86

[52] U.S. Cl. .......................... 250/559.32; 250/221; 356/28

[58] Field of Search ............................ 250/559.32, 222.1, 250/221, 216; 356/28, 27; 324/175, 178

[56] References Cited

U.S. PATENT DOCUMENTS

| | | |
|---|---|---|
| 3,487,226 | 12/1969 | Yetter et al. . |
| 3,624,401 | 11/1971 | Stoller . |
| 4,128,761 | 12/1978 | Oehler ................................. 250/222 R |
| 4,129,829 | 12/1978 | McLellan ............................. 250/222.2 |
| 4,155,647 | 5/1979 | Michel ...................................... 356/28 |
| 4,239,962 | 12/1980 | Oehler ................................. 250/222 R |
| 4,272,189 | 6/1981 | Bailey et al. ............................. 356/28 |
| 4,574,238 | 3/1986 | Weinlich ............................... 250/222.1 |
| 4,845,690 | 7/1989 | Oehler . |
| 5,577,733 | 11/1996 | Downing ................................. 273/348 |

OTHER PUBLICATIONS

"Shooting Chrony" brochure; Shooting Chrony Inc., N. Tonawanda, NY; 1 p.; Jan. 1996.
"Oehler Ballistic Chronographs" brochure; Oehler Research, Inc., Austin, TX; cover, table of contents, pp. 1–7, 28; Jan. 1996.

*Primary Examiner*—Que T. Le

[57] ABSTRACT

A chronograph for determining the muzzle velocity of a projectile fired from either a small arm or a rifle includes two IR light beam assemblies attached to a platform with respective photodetection circuits and a clamp for holding a vertical shot dispersion monitoring target plate at a rear extremity of the platform. The photodetection circuits provide start and stop signals for gating clock pulses of known frequency to an internal counter, the velocity being a scaled inverse of the measured interval. Each light beam assembly has two facing parabolic slit mirrors or reflectors with a photoemitter placed at one focal point and a photodetector at the other focal point for forming thin spaced beams oriented orthogonal to an intended path of the projectile. The photodetector circuit responds to a rapid drop in the total photocurrent of the photodetector in response to the partial blocking of the beam by a passing projectile. The photodetector circuit is DC coupled to the photodetector for providing an unsaturated calibration output signal. Also disclosed are design parameters for the parabolic mirrors and a method for calibrating the chronograph.

22 Claims, 6 Drawing Sheets

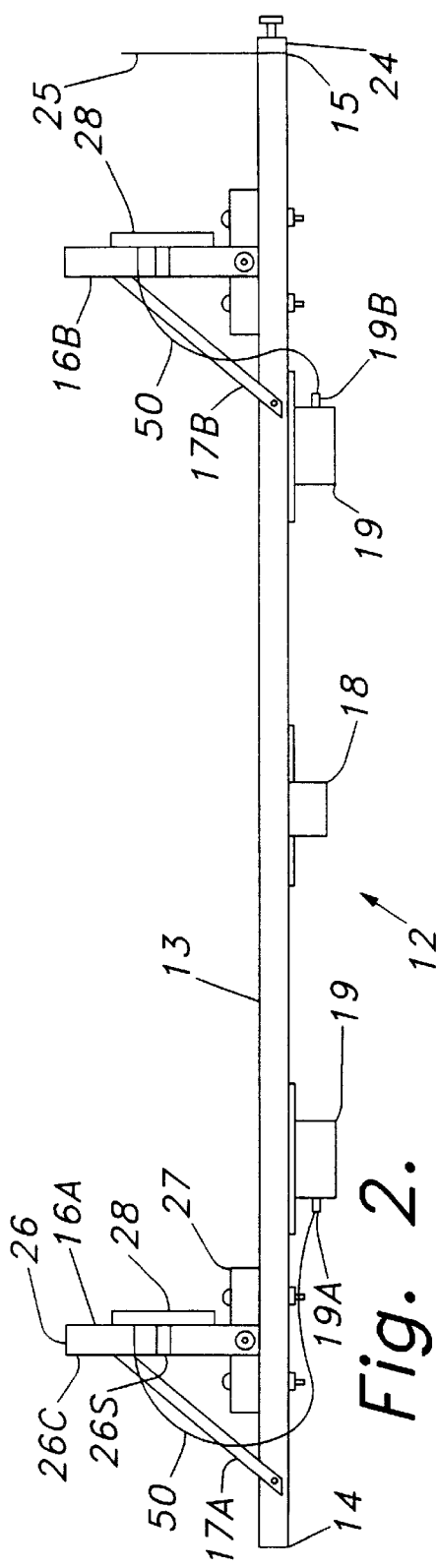
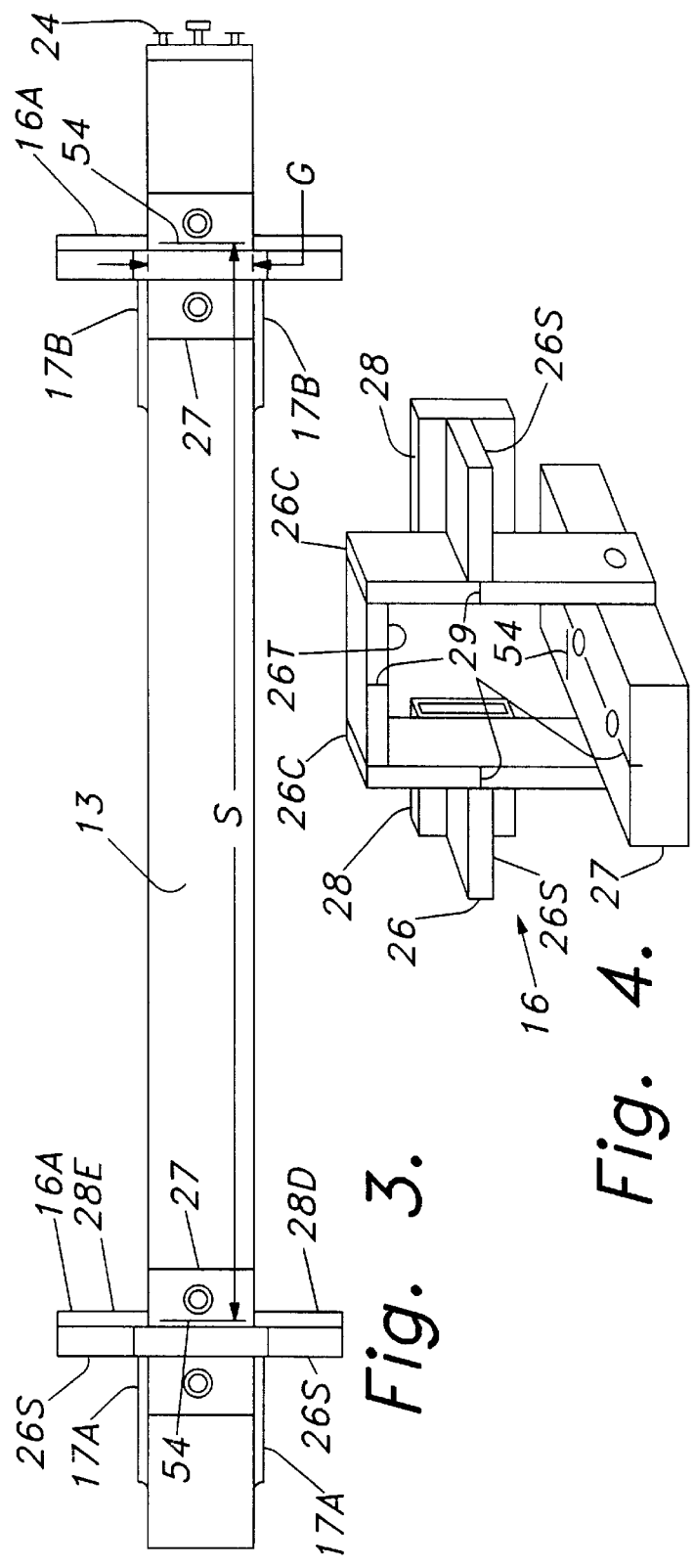

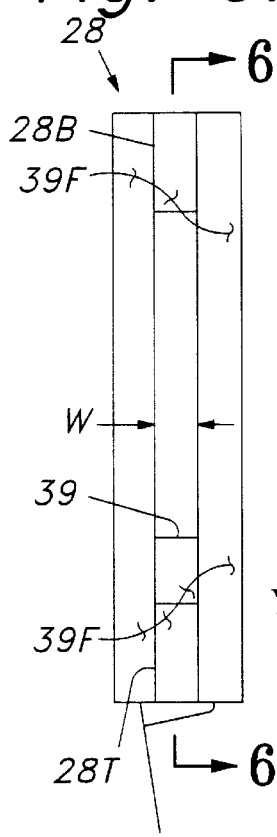
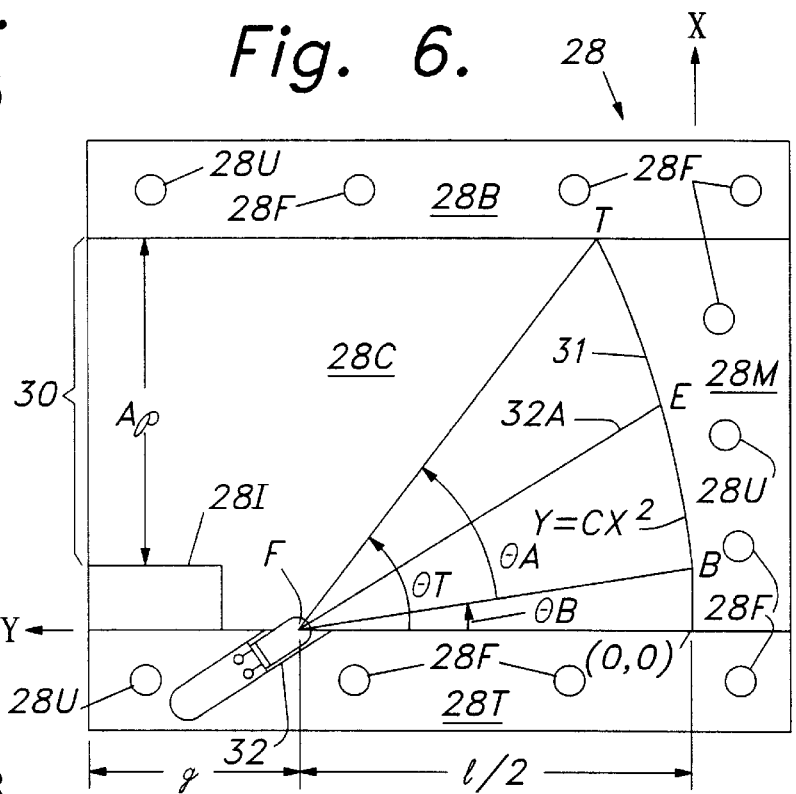
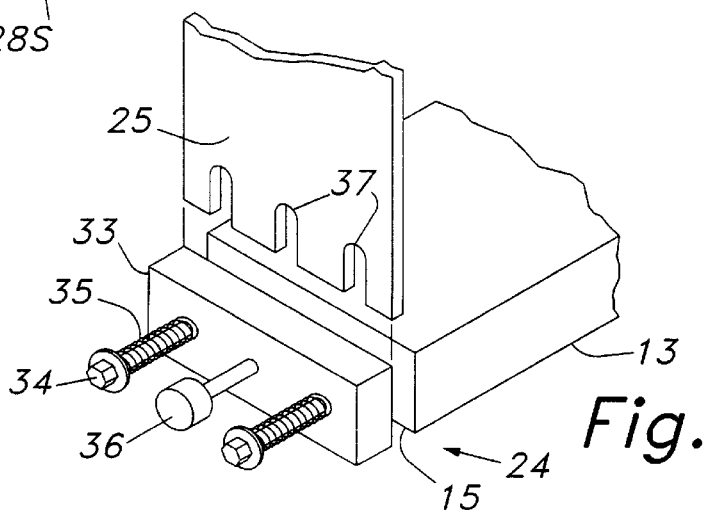

BALLISTIC VELOCITY MEASUREMENT SYSTEM HAVING DUAL SENSOR UNIT WITH PARABOLIC SLIT MIRRORS

BACKGROUND

The present invention relates to ballistic chronographs, which are devices for measuring the velocity of a projectile such as a bullet or pellet fired from a small arm or rifle. More particularly, the invention relates to systems which utilize the interruption of light for determining an elapsed time of the projectile between spaced intercepts, the velocity being inversely proportional to the elapsed time.

The general class of ballistic velocity determining apparatus for which this invention and those of the prior art relate use two or more light screens or beams which are separated by a measured or predetermined distance and are aligned orthogonally with respect to the path of the projectile. Velocity as used herein is defined as the time rate of change in distance that an object traverses, as it travels through space. The functional relationship is velocity equals distance/time. In the following description the velocity determined is the average velocity measured between two points and is not the instantaneous velocity determined at a single point in space. It is assumed that for the purpose of measuring muzzle velocities that the deceleration experienced by the projectile is constant over the distance for which the measurement is made. That is, from the instant that the projectile leaves the muzzle until it passes the far sensor. The term light is used in its broadest context, infrared, visible light or ultraviolet. The interruption of the light beams is sensed by photodetectors mounted in the forward and aft sensors which in turn produce signals which start and subsequently stop a counter which accumulates the number of clock pulses produced by an oscillator of known frequency. The velocity is then determined by dividing the distance by the elapsed time being the accumulated or counted number of clock pulses times the period or time interval per pulse.

A variety of light beams or screens are utilized in the chronographs of the prior art. U.S. Pat. Nos. 4,239,962 and 4,845,690 to Oehler disclose photodetector assemblies making use of diffuse ambient light. U.S. Pat. No. 4,272,189 to Bailey et al. discloses the use of pairs of linear arrays of light sources, photoemitters, and photodetectors mounted in a plane orthogonally to each other and to the path of the projectile. U.S. Pat. No. 4,574,238 to Weinlich discloses an apparatus which places facing photoemitters and photodetectors mounted behind optical slip apertures utilizing cylindrical lenses in a rectangular prism enclosure. U.S. Pat. No. 4,155,647 to Michel uses an expanded laser beam optically collimated in a thin beam which is reflected from two planar reflectors which in turn fold the beam back in the direction from which it was generated, thus producing two light screens. U.S. Pat. No. 5,577,733 to Downing discloses a light screen using a pair of light sources and associated linear arrays of detectors for detecting coordinates of passage of the projectile in a plane, in combination with an additional detector array in an axially spaced plane for determining projectile velocity. Other issues addressed in the above and other patents directed to ballistic velocity measurements relate to digital signal processing that is performed on the accumulated count, such as calculation and data presentation of average velocity, maximum and minimum velocities or extreme spread, and the standard deviation of a data set.

U.S. Pat. No. 4,128,761 Oehler discloses the use of a logarithmic amplifier and AC coupling for extending the dynamic range photodetectors using ambient lighting. Since the accuracy of a ballistic chronograph begins and ends with its sensor assemblies and detection electronics, the primary emphasis of the present invention is placed on these functions and not on the readout and data processing functions. U.S. Pat. No. 3,624,401 to Stoller discloses an optical scoring system using UV light reflected from passing projectiles.

U.S. Pat. No. 3,487,226 to Yetter et al. discloses a method and apparatus for determining the coordinate of a projectile by measuring the time interval between the interception of successive light screens with a predisposed spatial orientation. The light screens are formed through the use of planar arrays of subminiature incandescent lamps, with collimating lenses and a slit aperture. The photodetection array consists of a planar array of photodiodes, shown as phototransistors, with a corresponding slit aperture and collimating lens. The photodetector circuit consists of a plurality of photodetectors biased by an operating point bias stabilization circuit which is AC coupled to a two stage, AC coupled, pulse amplifier which in turn drives a Schmitt Trigger circuitry. Although the primary function of the apparatus is to determine the location of the bullet path in space, velocity can be determined from the intercept times between the parallel screens located at the entry and exit planes.

The velocity measurement schemes of the prior art typically exhibit one or more of the following disadvantages:

1. The circuitry is excessively complex for accommodating a large dynamic range in photocurrent when ambient lighting is used;
2. They are unreliable due to excessive false triggering, particularly when ambient lighting is used;
3. They are ineffective in that there is no clear delineation of the physical extent of the detection zone;
4. They are difficult to use in that the detection space is undesirably small; and
5. They are inaccurate, having poor transient response due to high parasitic capacitance of parallel photodiode arrays.

Thus there is a need for a chronograph apparatus that overcomes the disadvantages of the prior art, that is simple, direct, inexpensive to produce and easy to use, while providing one or more of the following:

1. Ballistic velocity measurement accuracies with RMS errors that are an order of magnitude better than that which is commercially available;
2. Velocity measurement of bullets or projectiles ranging from 0.177 inch caliber pellets to the full range of small arm and high-powered rifle calibers and corresponding velocities;
3. Operation independently of ambient lighting that can vary from indoor incandescent and fluorescent lighting to outdoor overcast and bright sunlight conditions;
4. Highly repeatable measurements over a long period of time for monitoring cartridge fabrication quality and/or performance including the performance of individual components of a cartridge;
5. Verifiable field calibration with a minimum of instrumentation;
6. Very low false data acquisition rates;
7. Immunity from muzzle blast, muzzle flash and shock wave effects of bullets traveling at supersonic velocities;
8. A relatively large aperture for relaxed aiming requirements; and
9. To provide for light screens having well defined and easily determined vertical, horizontal, and thickness (axial) boundaries.

SUMMARY

The present invention meets this need by providing a chronograph apparatus that is particularly accurate, effective for determining the velocity of a projectile over a wide range of ambient lighting conditions, and easy to calibrate. In one aspect of the invention, an apparatus for measuring the velocity of a projectile includes a base for placement in spaced relation to a ballistic path to be traversed by the projectile; first and second sensor units spaced longitudinally on the base for sequentially responding to passage of the projectile, each of the sensor units having a facing pair of parabolic slit mirrors supported on opposite sides of the ballistic path, a radiation source supported at a focal point of one mirror for directing radiation against the other mirror and focusing the radiation at a detector, the radiation being approximately collimated between the mirrors, a portion of the radiation being interrupted by passage of the projectile between the mirrors; and a circuit responsive to the detectors for determining a measured quantity being a function of an average velocity of the projectile between the sensor units.

For each of the sensor units the parabolic mirrors can have optical axes that are coaxially aligned and laterally spaced outside of the ballistic path. The second mirror and the radiation detector can be supported within an opaque detector housing that defines a rectangular entrance aperture for passing the collimated light, the housing forming a light shield for preventing ambient light from reaching the detector other than through the entrance aperture. Preferably internal surfaces of the detector housing are finished for preventing reflection of radiation such as ambient radiation that may obliquely enter the entrance aperture, onto the detector.

The one mirror and the radiation emitter can be supported between facing opaque first side walls, an exit aperture being defined between the side walls for passing the collimated light, the first side walls being connected in a light shield structure for preventing ambient light from entering between the side walls other than through the exit aperture. Preferably portions of the facing side walls between the emitter and the one mirror have reflective surfaces for augmenting radiation from the emitter being reflected by the one mirror and passing through the aperture. The entrance and exit apertures of the sensor units can have respective widths being not more than 1 percent of a longitudinal spacing between the sensor units. Preferably the entrance aperture widths are less than 0.5 percent of the longitudinal spacing. The first side walls can be planar, being closely spaced on opposite sides of the radiation source.

For each of the radiation detectors, the circuit can have a detector amplifier including a comparator stage having a comparator input responsively connected to the detector and a reference input connected to a voltage reference, and a comparator output; a triggerable element connected for response to the comparator output, the determination of the measured quantity being in response to operation of the triggerable element; a biasing element for loading the comparator input; and a bias feedback stage having an input responsively connected to the first gain output and a linear voltage output that feeds an active feedback element of the bias feedback stage for variably coupling the biasing element to the comparator input. Thus the loading of the comparator input variably compensates for variations in ambient radiation reaching the radiation detector. Preferably the biasing element is adjustable for correspondingly varying a quiescent level of the voltage output, thereby to effect a desired operating point of the active feedback element. Preferably the linear voltage output is accessible for facilitating identification of a reference plane of the associated detector.

Preferably each radiation emitter is electrically interruptible, the circuit having a variable offset element to which the measured quantity is responsive, the circuit being operable for simultaneously momentarily interrupting the emitters in a calibration sequence wherein adjustment of the offset element is effective for canceling propagation delay skew of the circuit downstream of the radiation emitters. The measured quantity can be a time interval between the interruptions of the radiation onto the detectors by the projectile, the offset element being adjustable to produce a null measurement of the time interval in the calibration sequence. The circuit can further include means for computing the average velocity as a scaled reciprocal of the measured quantity.

The apparatus can further include means for determining projectile path deviations between plural measured projectiles. The means for determining projectile path deviations can include a clamp for supporting a target plate orthogonally intersecting the ballistic path. The clamp can be located in spaced relation to the second sensor unit opposite the first sensor unit.

In another aspect of the invention, a method for calibrating a ballistic chronograph includes the steps of:

(a) providing an assembly including a spaced pair of sensor units, each sensor unit having a radiation emitter and sensor, respective optical paths between the emitters and detectors intersecting a ballistic path for being sequentially interrupted by a projectile, the radiation emitters being electrically activated in response to an external signal;

(b) providing a timer for measuring a time interval between sequential interruptions of the optical paths in response to signals from the detectors, thereby to produce a measured function of an average velocity of the projectile;

(c) simultaneously electrically interrupting the activation of the emitters for producing a test interval output of the emitters and a corresponding test output of the timer; and (d) offsetting a subsequently measured time interval being responsive to the projectile negatively by the test interval output for producing a corrected measured function of the average projectile velocity.

The method can include the further steps of:

(a) determining whether the test output of the timer is zero; and (b) if so: interchanging connections between the detectors and the timer; repeating the step of interrupting for producing a new test output; restoring the connections between the detectors and the timer; and using the new test output oppositely in the step of offsetting.

In another variation of the method wherein each optical path has a thickness in the direction of the ballistic path, the method can include the further steps of:

(a) providing a rod having a thickness being less than the thickness of each optical path;

(b) providing for each of the sensors a non-saturated test signal being responsive to the sensor;

(c) holding the rod oriented perpendicular to the ballistic path;

(d) moving the rod in the direction of the ballistic path between opposite sides of each optical path for partially blocking the optical paths;

(e) during the step of moving the rod, monitoring corresponding test signal;

(f) determining respective locations of the rod in the direction of the ballistic path corresponding to maximum blockage of the optical paths at corresponding singularities of the test signals; and (g) measuring a distance between the locations in the direction of the ballistic path.

DRAWINGS

These and other features, aspects, and advantages of the present invention will become better understood with reference to the following description, appended claims, and accompanying drawings, where:

FIG. 2 is a side elevational view of a platform unit of the chronograph of FIG. 1;

FIG. 3 is a plan elevational view of the platform unit of FIG. 2;

FIG. 4 is a rear oblique perspective view of a sensor assembly of the platform unit of FIG. 2;

FIG. 5 is a side elevational view showing an aperture end of a mirror subassembly portion of the sensor assembly of FIG. 4, the mirror subassembly being shown in an inverted orientation from that of FIG. 4;

FIG. 6 is a longitudinal sectional view of the sensor assembly of FIG. 5 on line 6—6 therein, inverted as in FIG. 5;

FIG. 7 is a rear oblique perspective view of a target plate and target plate clamping facility of the platform unit of FIG. 2;

DESCRIPTION

Figure 1:
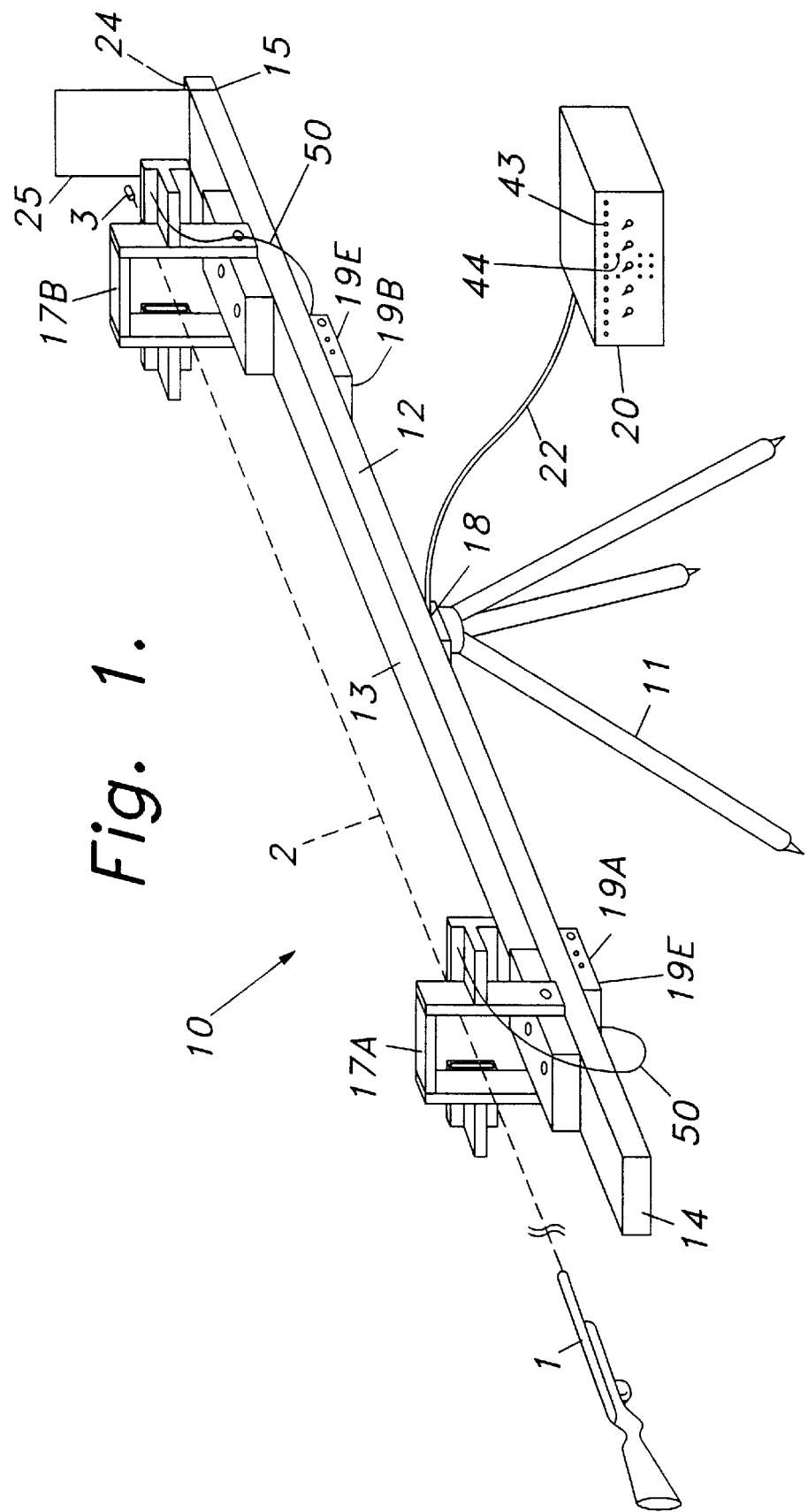
FIG. 1 is a perspective view of a ballistic chronograph according to the present invention, in relation to a rifle and projectile path extending therefrom.

The present invention is directed to a ballistic chronograph that is particularly accurate, reliable, effective in a wide variety of ambient conditions, and that is easy to use and inexpensive to provide. With reference to FIGS. 1–10 of the drawings, a chronograph apparatus 10 includes a platform unit 12 that is supported on a tripod 11 relative to a firearm 1 having extending therefrom a projectile path of a bullet 3. The platform unit 12 includes a plank 13 having respective front and rear extremities or ends 14 and 15. A spaced pair of sensor assemblies 16 (also designated front and rear sensor assemblies 16A and 16B) are attached to the top surface of the plank 13, positioned such that their centers are approximately one foot from each end and approximately five feet apart for defining a basic uncalibrated measurement span of the chronograph apparatus 10. Two pairs of braces 17A and 17B are attached to the forward facing frames of the sensor assemblies 17A and 17B. The tripod 11 is removably fastened to a tripod mount 18 at the bottom center of the platform 12 in a conventional manner. As alternatives to the tripod 11, telescoping legs can project downwardly and outwardly from the four corners of the platform unit 12, or three such legs, two forward and one centered aft, can be used to support the platform.

Two electronic assemblies or enclosures 19E are attached to the bottom of the plank 13 for housing respective shock mounted photodetector circuits 19, the circuits being individually designated 19A and 19B. A clock/counter unit (CCU) 20 is connected to the platform unit 12 by suitable cabling 22, the cabling 22 extending from the photodetector circuits 19A and 19B, being tied off at the side of the tripod mount 18 if desired, in any suitable manner. A spring loaded clamp 24 is mounted on the aft end 15 of the platform unit 12 for holding a vertically oriented shot dispersion monitoring target plate 25 which can be made from a thin, stiff and easily perforated material. In the exemplary configuration shown in FIG. 1, the plank 13 measures 2 inches high by 6 inches wide by 7 feet long, providing a sensor plane separation distance S of approximately five feet between the sensor assemblies 16.

The plank 13 can be made from any material which is stiff, noncompliant, dimensionally stable, preferably also being an acoustic energy absorber. The exemplary sensor spacing of five feet is a preferred minimum for limiting an RMS measurement error contribution to less than 0.01% for a representative projectile velocity of 3000 fps.

The sensor assemblies 16 create respective thin rectangular beams that traverse the bullet path 2, passage of the bullet 3 being detected by interruptions of the beams. With particular reference to FIGS. 2, 3, and 4, each sensor assembly 16 includes a frame 26, attached to a base 27, which is in turn attached to the plank 13. Two facing parabolic slit mirror subassemblies 28 are attached to the frame 26, the mirror subassemblies being further designated emitter subassembly 28E and detector subassembly 28D. The mirror subassemblies 28 are mounted in laterally spaced facing coplanar relation at opposite sides of the frame 16, orthogonally to the projectile path 2. More particularly, the frame 26 includes a pair of column members 26C, a pair of wing members 26S that project outwardly at opposite sides of the frame 26, and a top member that connects upper extremities of the column members 26C. The column members 26C, the top member 26T, and the base 27 define a rectangular passage through which the ballistic path 2 extends, indicia 29 being applied to the frame 26 and the base 27 for identifying a preferred alignment of the projectile path 2. Each mirror subassembly 28 is mounted against rear surfaces of one of the column members 26C and a corresponding one of the wing members 26S as shown in FIGS. 2, 3, and 4.

As shown in FIGS. 5 and 6, each mirror subassembly 28 is generally rectangular, having an opening or aperture 30 at one end, and a narrow rectangular mirrored surface 31 having a parabolic contour at the other end. The radiant energy associated with an IR device 32 is directed along its axis 32A, being reflected by the mirrored surface 31, the axis 32A being aligned with a midpoint of the parabolic contour of the mirrored surface 31, at a height corresponding to the preferred alignment of the ballistic path 2 as marked by the indicia 29, described above. As further described below, the IR device 32 is an emitter 32E in the emitter subassembly 28E, being a detector 32D in the detector assembly 28D. Each of the IR devices 32 is positioned at the focal point of the parabolic mirror 31 of the respective mirror subassembly 28. Further, each of the mirrored surfaces 31 has a major axis Y that extends horizontally toward or below a bottom extremity of the aperture 30, the mirrored surface extending vertically in a direction X to an elevation corresponding to an upper extremity of the aperture 30. As used herein, distances away from the major axis Y are described as upward for ease of understanding, the direction being reversed in preferred implementations of the chronograph 10 as described further below, FIGS. 5 and 6 being inverted as indicated above. Thus radiation from the emitter 32E is focused at the detector 32D after passing in a thin substantially collimated beam between the respective apertures 30 of the subassemblies 38E and 28D. The use of parabolic mirrors essentially provides for a collimated beam over the aperture and across the gap separating the two subassemblies 28. It will be understood that collimation relative to a point using a mirror generally requires the mirror surface to be a parabola or revolution (compound curvature). However, simple curvature is satisfactory in the present invention because a width W of the aperture 30 is narrow compared with the height, and because collimation is not strictly required as long as substantially all of the light leaving the emitter subassembly 28E reaches the detector 32D of the detector subassembly 28D. The width W of the apertures 30 is preferably as small as practicable in order to provide high radiant flux density. The width W can correspond to a maximum width of the IR LED or photodetector device 32, and can be approximately 0.25 inch. For example, IR emitters having a 60° beam angle are typically 0.25 inch in diameter, those of 40° beam angle being approximately 0.20 inch in diameter. Typical photodetectors have diameters of between 0.10 inch and 0.20 inch. Other details of the IR LED mirror subassembly 28E and the photodetector mirror subassembly 28D are identical with the following exceptions:

1) A face 30F surrounding the aperture 30 of the IR LED parabolic slit mirror subassembly 28E is painted flat black in order to minimize the reflection of ambient lighting back into the aperture 30 of the photodetector mirror subassembly 28D.

2) Respective inside surfaces 28C of the side members 28S of the IR LED mirror subassembly 28E are mirrored reflecting surfaces whereas the inside surfaces 28C of the side members 28S of the photodetector subassembly 28D are painted a non-reflecting flat black to minimize the effects of ambient lighting. Since the radiant energy pattern of the IR LED 32E is symmetrical about its beam axis, it is important to project as much energy down the inside of the subassembly as possible, other than that which would be subtended by the solid angle of the beam across the aperture 30. All other internal surfaces of the mirror subassemblies 28 are painted non-reflecting flat black. The mirror subassemblies are mounted upside down from the orientation shown in FIGS. 5 and 6. This is done in order to improve the shielding of the photodetector 32D from ambient lighting. The radiant energy source, the IR LED 32E, and the photodetector 32D, preferably an IR detection phototransistor, preferably have a matched spectral response for further minimizing the effects of stray ambient radiation sources.

As indicated above, FIG. 6 shows the contour of the reflective surface 31 plotted relative to the X and Y axes.

According to the present invention, the contour is parabolic for producing a substantially collimated beam that extends between the apertures 30 of the mirror subassemblies 28D and 28E, the contour satisfying the following boundary conditions:

(a) The angle of incidence equals the angle of reflection of a ray impinging on a reflective surface.

(b) The total path length of a ray is constant across an aperture to a focal point. This condition is required in order to preserve wave front coherency at the focal point.

Particular geometric features of the mirror subassembly 28 are referenced as follows:

$A_p$ is an aperture height of the aperture 30;

$\theta_A$ is a beam angle, of the IR LED or portion thereof (generally defined as the 3 db points on the radiant energy vs. angle plot);

$\theta_B$ is a beam offset angle (also referred to as the bottom angle), the angle from the y axis to $(x_B, y_B)$;

F is a focal point of the mirrored surface 31;

g is an internal gap between the aperture face 30F and the focal point F;

$\theta_T$ is the angle from the y axis to $(x_T, y_T)$ or $\theta_T = \theta_A + \theta_B$;

$y_F$ is the focal point on the y axis;

The design is characterized in the following determinations of $(x_T, y_T)$, $(x_B, y_B)$, l, $y_F$ and c, based on $y = cx^2$, the equation for a parabola.

Where, $(x_T, y_T)$ are the coordinates of a point on the parabola at the top of the aperture;

$(x_B, y_B)$ are the coordinates of a point on the parabola at the bottom of the aperture $(A_p = x_T - x_B)$;

$(x_E, y_E)$ are the coordinates of a point on the parabola in the middle of the aperture;

c is the coefficient of the $x^2$ term which defines the parabolic curve.

Parameter Determination:

$z_T = (\tan \theta_T) / \{-1 + [1 + (\tan \theta_T)^2]^{1/2}\}$ $z_B = (\tan \theta_B) / \{-1 + [1 + (\tan \theta_B)^2]^{1/2}\}$ $x_T = A_p / (1 - z_T / z_B)$ $y_E = y_B + A_p / 2$ $l = x_T z_T$ $y_F = l / 2$ $c = 1 / (4 y_F)$ $x_B = x_T - A_p$ $y_T = c x_T^2$ $y_B = c x_B^2$ In the exemplary configuration of FIGS. 5 and 6, the mirror subassembly 28 has the aperture $A_p = 2.0$ inches, the offset angle $\theta_B$ being 10°, the parabolic mirror surface 21 being contoured for use with the beam angle $\theta_A$ of the IR devices 32 (3 db points) being 45°. A small optional stop insert 28I is mounted inside the mirror assemblies 28 for restricting the aperture 30 in front of the IR devices 32 for which a beam offset angle $\theta_B$ is greater than zero degrees. The 2-inch aperture $A_p$ represents a minimum practical aperture and subassemblies with the aperture $A_p$ being 6.0 inches represent a practical upper limit. A preferred aperture height $A_p$ is approximately 3.0 inches for providing a desired combination of ease of use (detection space) and physical size. It will be understood that the height of the frame 16 is increased for configurations of the mirror subassemblies 28 having larger apertures $A_p$ and/or beam offset angles $\theta_B$. The frame height is also increased to the extent that the nominal height of the projectile path 2, which corresponds to the center of the aperture $A_p$, is raised above the base 27 of the frame 26. A total path length L of the beam from the IR LED 32E to the phototransistor 32D, or from focal point to focal point, is the distance across a gap G of the sensor assembly 16 (See FIG. 3) plus respective beam distances traversed within the mirror subassemblies 28, two times the mirror path length l and the internal gap g, $L = G + 2(g + l)$. The spacing G between the mirror subassemblies 28 (and the column members 26C) is not critical, a convenient choice being the width of the platform plank 13. If desired, the spacing can be increased.

The forward sensor assembly 16A of the platform unit 12 is normally positioned approximately 10 feet from the muzzle of the firearm 1. The muzzle velocity is slightly greater than the velocity as measured by the chronograph 10, to the extent that the projectile velocity decreases between the muzzle and a medial location between the sensor assemblies 16. If desired, the muzzle velocity can be approximated by adding a correction factor to the measured velocity, the correction factor being the distance from the muzzle to the midpoint of the sensor assemblies, multiplied by an average drop in velocity per foot for the projectile velocities being measured. A value for the drop in velocity per foot of a specific bullet or its equivalent can be found in reloading handbooks published by ammunition component manufacturers. This value could also be obtained by extrapolating from velocity data, using the ballistic chronograph 10, at several distances down range. In an exemplary case of a 7 mm (0.284 inch caliber) 160 grain spire point bullet (Sierra Rifle and Handgun Reloading Manual, $4^{th}$ Ed., page 826), the muzzle velocity can range between 2700 and 2800 fps, the velocity 50 yards downrange being from 2604 and 2702 fps, the velocity dropping an average of 0.648 fps/ft. Thus the muzzle velocity can be approximated by the measured average velocity plus 0.648 times a measured distance in feet from the firearm 1 to the midpoint of the spacing S. Corresponding determinations are applicable to other projectiles and velocities.

Sighting alignment of the firearm is performed by using a bench rest (not shown) and aligning the sights with the horizontal marks of the indicia 29 on the forward faces of the sensor assemblies 16A and 16B. The bench rest is then raised by an offset distance between the sights and the bore of the firearm, typically approximately 1.5 inches. Subsequent sightings are then performed by aiming above the horizontal marks by this distance. Alternatively, the sensor assemblies 16 can be provided with counterparts of the indicia 29 being raised by the offset distance. An error contribution resulting from off-axis aiming of the firearm 1 of 1 inch is $[(1.0)^2+60^2)^{1/2}-60]*100/60=0.014\%$. Reducing the aiming error to 0.3 inch results in an error contribution of only 0.00154%, which is insignificant.

As shown in FIG. 7, the target plate clamp 24 includes a clamp member 33 being supported by a pair of locating screws 34, a compression spring 35 being carried on each of the screws 34 for biasing the clamp member against the rear extremity 15 of the plank 13. The target plate 25 is insertable between the clamp member 33 and the extremity 15. A thumb screw 36 protrudes through the clamp member 33, threadingly engaging the plank 13 for more firmly securing the target plate 25 in the clamp 24. Preferably the thumb screw 36 is captive with some axial clearance, for selectively holding the clamp 24 open to facilitate the insertion of the target plate 25. Alternatively, the screw 36 can rigidly engage the clamp member 33, forming a knob for manually holding the clamp 24 open. The target plate 25 has clearance slots 37 forged therein for receiving the screws 34 and 35. (In the rigid knob configuration of the screw 36, the central slot 37 can be omitted.) A suitable material for the clamp member 33 is hemlock. The target plate 25 can be marked with additional counterparts of the indicia 29 (which can be vertically offset as described above) for further facilitating proper aiming of the firearm 1.

Figure 8:
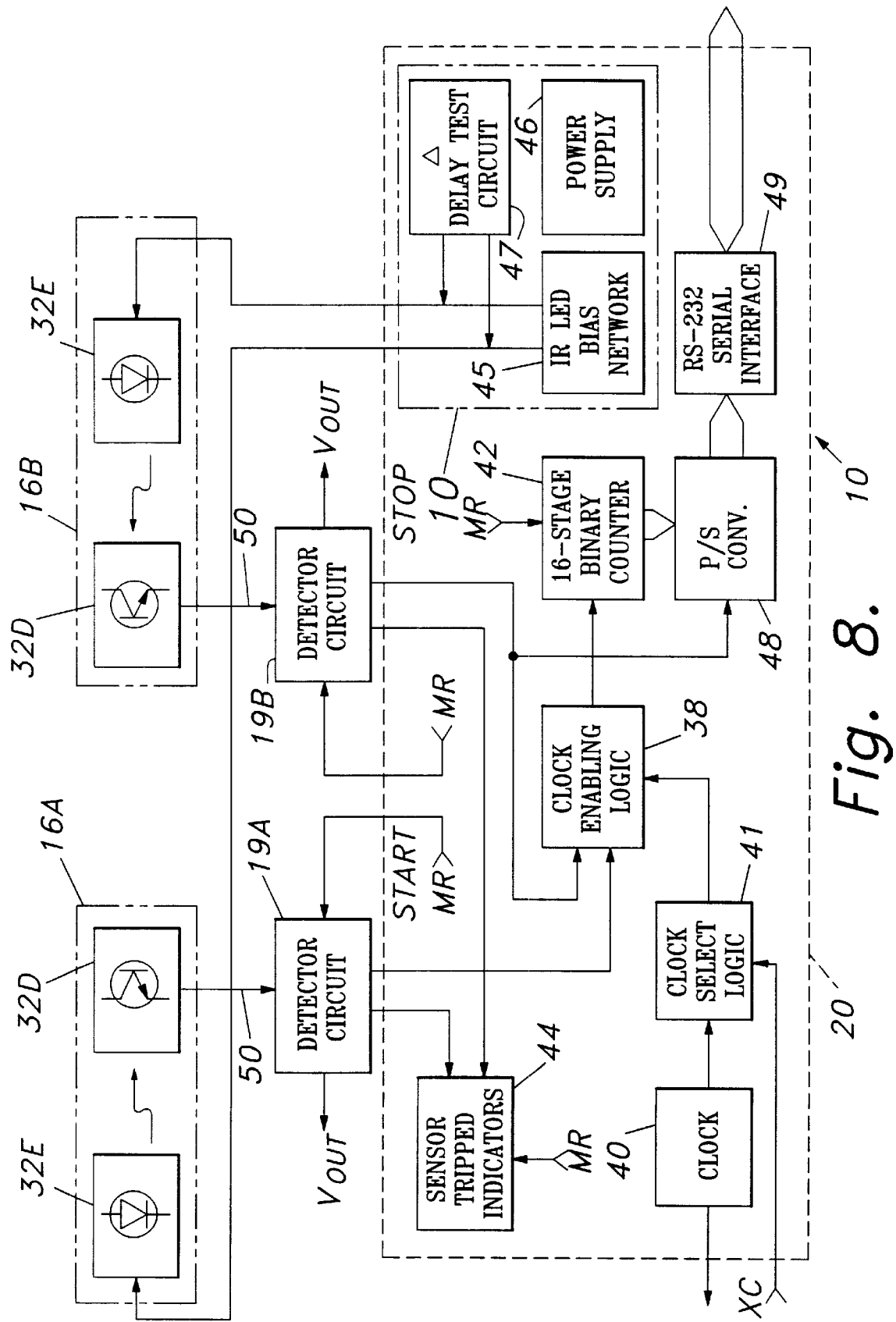
FIG. 8 is a schematic block diagram of an electronic circuit of the chronograph of FIG. 1.

As shown in FIG. 8, the basic elements of the chronograph 10 include the sensor assemblies 16A and 16B, which include the photoemitters 32E and photodetectors 32D, photodetection circuits 19A and 19B, and the CCU 20. The function of the CCU 20 is to provide a time base and interval count in response to start and stop signals from the forward and aft sensor assemblies 16A and 16B. Ancillary functions include providing the bias current for the IR LEDs 32E, forward and aft sensor tripped indications, binary count readout, system master reset, and bias voltages for the IR emitters 32E of the sensor assemblies 16. The CCU 20 includes clock enabling logic 38, a clock circuit 40, clock select logic 41, a counter 42 which can have associated output indicators 43 located on the CCU 20 as shown in FIG. 1, sensor tripped indicators 44, a photoemitter bias network 45, and a power supply 46. The clock circuit 40 includes a crystal controlled oscillator for generating a time base to provide the necessary accuracy, both in an absolute sense and with short and long term frequency stability. The circuit topology can be that of a conventional Pierce-IC crystal oscillator, operated at 2 MHz and feeding a single stage divider for generating a clock output at 1 MHZ corresponding to a 1 $\mu$s time base interval. The absolute accuracy of the clock circuit 40 using commercially available components is typically ±100 ppm or ±0.01% over a temperature range of 0 to 70° F. Also, there is a time quantization error of ±1 $\mu$S at 1 Mhz, which at 3000 fps is 5/3000 sec=1667 $\mu$S or ±0.06% over a 5-foot span. A higher frequency would provide additional precision. However, doubling the frequency would only improve the overall system RMS error by approximately 0.01% at a 3000 fps projectile velocity.

The counter 42 can be a straight ripple thru binary counter of 16 stages; consequently, the minimum count is 1 and the maximum count 65535. For a 1 MHz clock the maximum interval is 0.065535 seconds; with the distance S being 60 inches, this corresponds to a minimum velocity of 76.294 feet per second.

The clock select logic 41 selects between an external clock (which can be a buffered output of the 2 MHz oscillator) or the internal 1 MHz clock of the clock circuit 40.

The clock enabling logic 38 operates to gate clock pulses to the counter 42 only during an interval of time following tripping of the front detector circuit 19A and prior to tripping of the rear detector circuit 19B. The sensor tripped LED indicators 44 can be driven by buffer flip-flops in response to the detector circuits 19.

The binary counter light emitting diode indicators 43 are preferably enabled only when counting is complete, because the EMI noise level of the counter output indicator LEDs would interfere with the photodetectors in the sensor assemblies. Also, it is not desirable to have both the counter LEDs and the IR LEDs in the sensor assemblies 16 on at the same time because of the high current requirements of both of these functions. A suitable test circuit can set each stage of the counter 42 and temporarily enable the binary counter output indicators 43.

Preferably, the CCU 20 also includes a delay test circuit 47 that is shunt-connected to the bias network 45 as further described below. The CCU 20 also includes an interface to an external computer, an exemplary implementation including a parallel-to-serial converter 48 and a serial interface 49.

Figure 9:
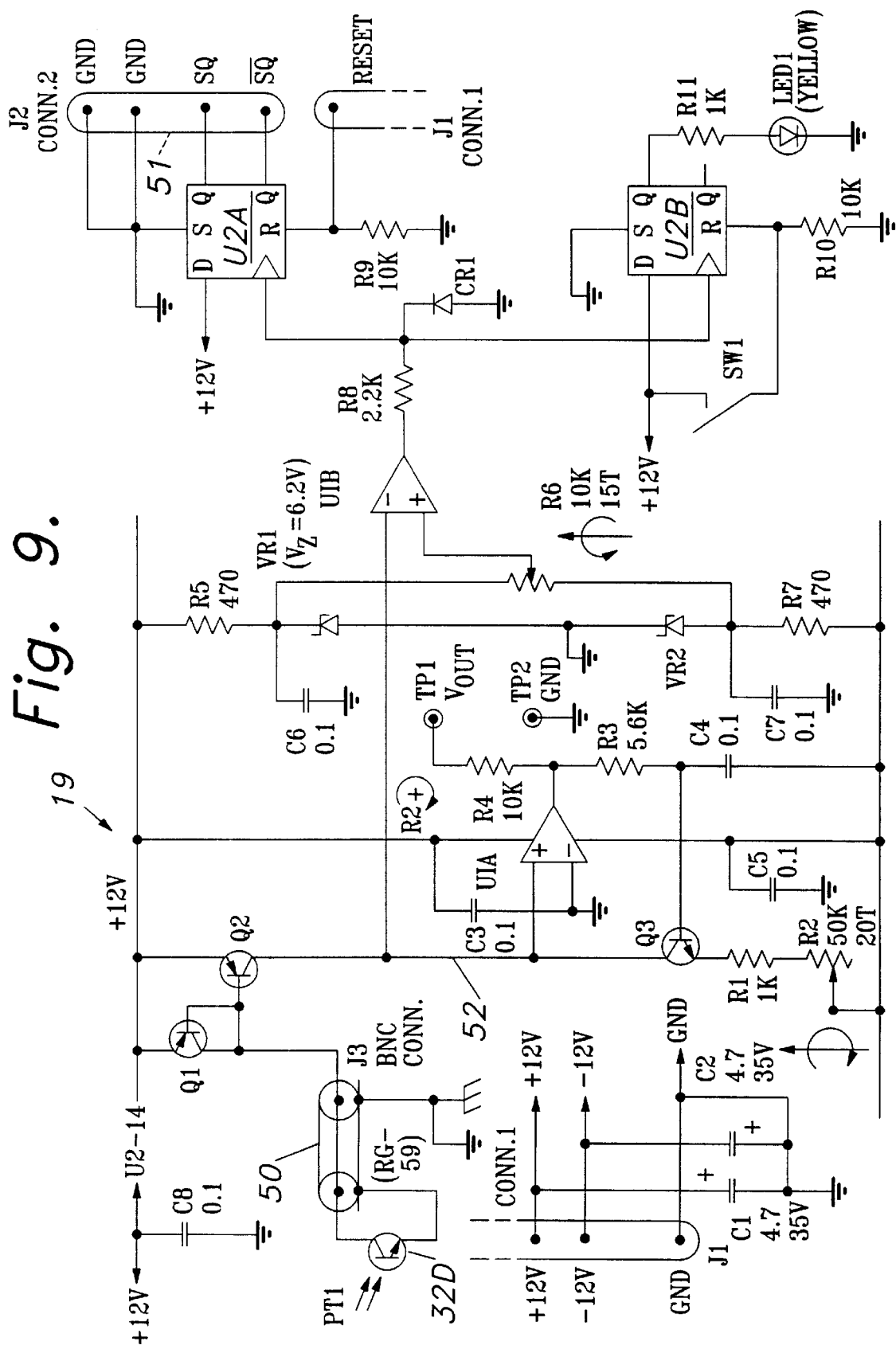
FIG. 9 is a circuit diagram of a detector circuit portion of the chronograph circuit of FIG. 8.

As described above, the photodetector circuits 19A and 19B are housed in the aluminum enclosures 19E, under the plank 13 of the platform 12. The enclosures 19E are preferably shock mounted to the plank 13 for reducing the effects of muzzle blast and shock waves generated by bullets traveling at supersonic velocities. Metal enclosures are preferred for reducing the effects of electromagnetic interference. The circuits 19A and 19B are identical; as shown in FIG. 9, the photodetector circuits 19 are connected to the photodetector 32D, also designated phototransistor PT1, via a short length of low capacitance coaxial cable 50. The photodetector 32D is preferably an IR sensing phototransistor producing a photocurrent that is reflected thru a unity gain current mirror Q1 and Q2, into a summing node 52 of a noninverting operational amplifier U1A, the amplifier U1A being referenced to ground. A negative feedback loop is formed from the output of the operational amplifier U1A through an emitter follower Q3. The collector current of the emitter follower Q3 is adjusted by the output of the operational amplifier U1A to be equal and opposite to the photocurrent flowing out of the collector of the current mirror Q2, in order to maintain an average voltage of the summing node 52 at zero volts within the pass band of the feedback loop. A low pass filter formed by R3 and C4 determines a dynamic response of the feedback loop. The cutoff frequency is selected so that the feedback loop remains closed and responds to variations in photocurrent due to changes in outdoor ambient lighting conditions out to the 4th harmonic of the 60 Hz line frequency of utility power in order to compensate for lighting conditions encountered in indoor lighting, both incandescent and fluorescent, in addition to varying levels of IR beam radiation levels. If a rapid drop in photocurrent occurs, the loop no longer remains closed and the voltage at the summing node 52 falls to some negative value proportional to the drop in photocurrent. A potentiometer R2 provides a range of adjustment necessary to accommodate variations in ambient lighting, differences encountered in phototransistor gain and IR beam radiation levels, being normally adjusted such that the output of the operational amplifier U1A assumes a nominal value of −5.0 volts.

An operational amplifier U1B is configured as a comparator for monitoring the voltage at the summing node 52. The noninverting input of the comparator U1B is referenced by a potentiometer R6 to a negative trigger voltage which is slightly more negative than the most negative voltage that occurs under normal operating conditions. The potentiometer R6 can be set to a negative voltage of 20 to 30 mV for example, which is below the voltage at the summing node 52 when there are no beam interruptions due to a projectile passing through the beam of IR radiation between the mirror assemblies 28E and 28D. Zener diodes VR1 and VR2 serve as constant voltage references for the potentiometer R6. When the voltage at the summing node 52 falls more negative than the threshold reference voltage applied to the noninverting input of the comparator U1B, the output of the comparator U1B switches from its most negative value to its most positive value. A current limited clamp CR1 prevents the output of the comparator U1B from going more negative than the forward voltage of the diode CR1.

A device suitable for use as U1 is a TL082 operational amplifier (LM353 equivalent) being available from a variety of sources, and characterized by an open loop gain of 100 db (100,000), a frequency response in terms of gain bandwidth of 4 Mhz, and a slew rate of 13 V/$\mu$S. Timing errors can result from varying differential input voltage overdrive producing corresponding varying delays in comparator output responses. The slew rate of 13 V/$\mu$S limits such delays to a maximum of approximately 1.25 $\mu$S. In practice, the timing errors are greatly reduced by cancellation between the detector circuits 19A and 19B, and by compensation using the delay test circuit 47 as described below. The remaining timing errors due to variations in the delays in successive operations of the chronograph 10 are likely to be insignificant.

A positive voltage excursion at the clock inputs of respective edge-triggered D flip-flops U2A and U2B transfers a true (1) state to the Q outputs of both flip-flops, provided that they had been previously reset. The flip-flop U2B, with its associated manual reset push-button switch SW1, is used to facilitate adjustment of the threshold voltage by the potentiometer R6 prior to making the velocity measurements, visual indication of the state of the flip-flop U2B being provided by LED1. The flip-flop U2A provides complementary output signals SQ and $\overline{SQ}$ respectively, being connected to the CCU 20 by a cable 51 for signaling the sensor tripped indicators 44, and for starting and stopping the counter 42. A positive reset signal from the CCU 20 is applied to the R input of the flip-flop U2A prior to making a velocity measurement.

The three most important characteristics of the operational amplifiers U1A (and U1B) are that of high common mode input voltage range, preferably ±15 volts, high differential input voltage range, preferably ±30 volts, high gain bandwidth, preferably $\geq 4$ MHz, and high input impedance, preferably $\leq 10^{12}$ ohms. Other important characteristics include input noise voltage $\leq 16$ nV/Hz, input noise current $\leq 0.01$ pA/Hz, 1/f noise corner=50 Hz, open loop gain $\geq 100$ db, and output voltage slew rate $\geq 13$ V/us.

In an experimental prototype of the chronograph 10 having the aperture height $A_p$ of 3 inches, a total photocurrent of approximately 0.8 mA was measured, being two orders of magnitude greater than a calculated minimum total photocurrent required to detect a 30 cal. bullet passing proximate an inside edge of the sensor assembly 16. The calculations were based on the impedance of the summing node 52 being 50 K ohms, the threshold of the comparator U1B being 30 mV above the noise floor, yielding a change in photocurrent of approximately 0.6 $\mu$A. This value was multiplied by the ratio of the total area under a cosine-squared response curve within a 40° beam width to a 4° edge portion being 1/10 of the 3 inches, a ratio of approximately 14. Thus the calculated total required photocurrent is only approximately 8.5 $\mu$A.

The sensor beam spacing calibration measurement is performed by passing a vertically oriented probe, the diameter of which is approximately 1/3 the beam thickness (0.0625 inch for example) and height equal to the aperture, thru the beam and monitoring the unsaturated output voltage of U1A, $V_{out}$, from each of the photodetection circuits 19A and 19B. The probe can be pressed into a suitable block or "boat" for facilitating movement while maintaining the vertical alignment. A symmetrical "V" response should be noted with a very well defined and sharp null singularity. If an asymmetrical "V" response is noted, then the parabolic mirrors are not orthogonal to the axis of the platform, and corrective action is indicated. Also, there is no assurance that the mechanical center of the plane of the beam will coincide with the electrical center. Consequently, the linear (unsaturated) photometric output of the photodetector circuit 19 significantly facilitates an accurate determination of the sensor plane separation S. The position of the probe is marked as a sensor plane indicia 54 on the top of the sensor assembly base at the point at which the output voltage minima is detected, and the process is then repeated for each of the sensor assemblies 16. The sensor plane separation distance S is then measured between the two sets of marks. The output voltages $V_{OUT}$ can have external connections for facilitating accuracy verification of the chronograph 10 following normal use thereof as well as during initial calibration. orthogonality of the beam can also be checked, for example, by making the measurements with the boat displaced (by 1 inch for example) on either side of the center of the base 27 and measuring distances between corresponding counterparts of the plane indicia 54. An orthogonality error of 0.025 inch corresponds to ±0.012% of the average spacing S of 60 inches. Similarly, an error in measuring the spacing S of ±0.5 mm corresponds to an error contribution of 0.033%.

Figure 10:
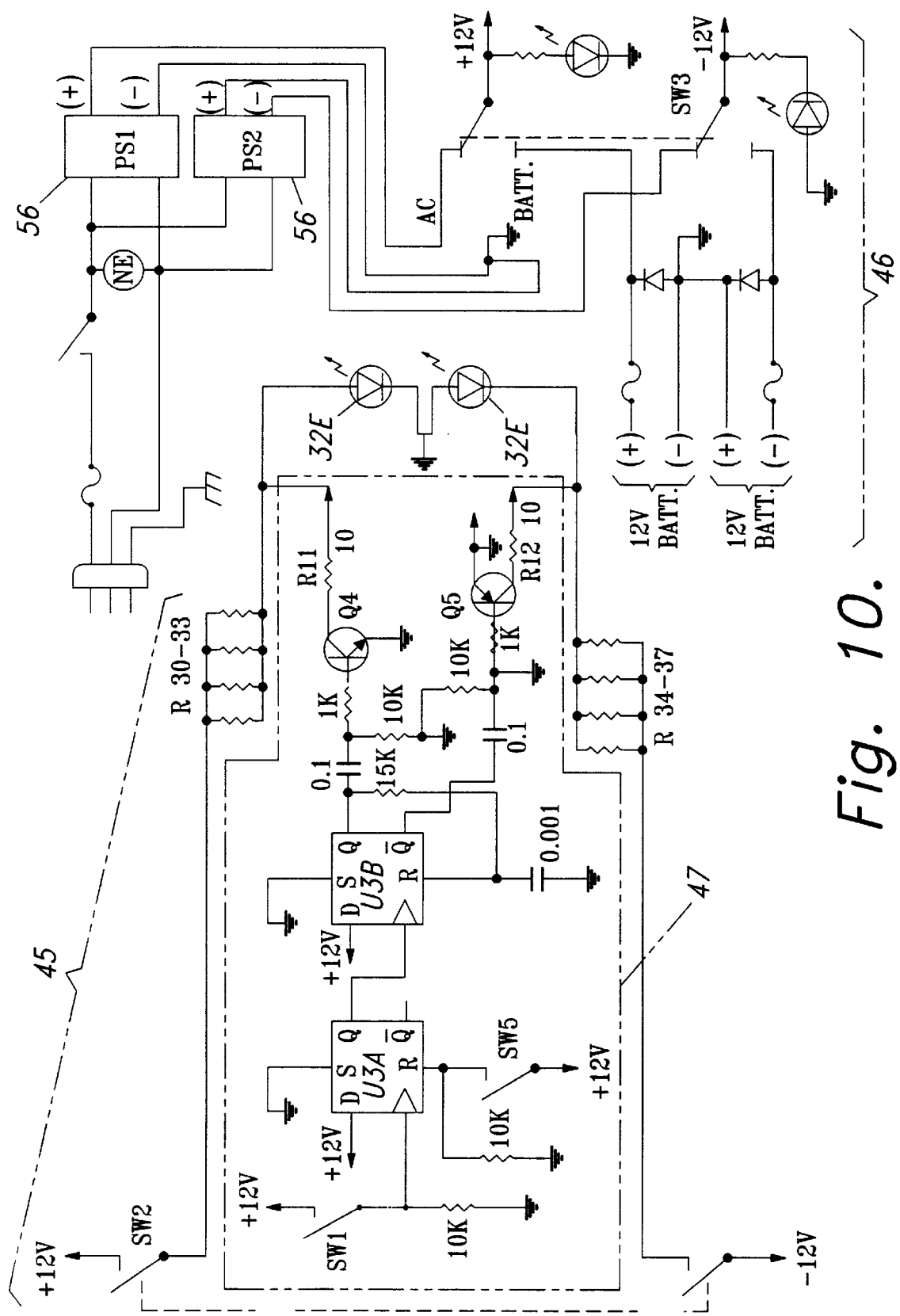
FIG. 10 is a delay test circuit portion of the chronograph circuit of FIG. 8.

As shown in FIG. 10, the IR LED bias network 45 includes parallel resistor networks, R30–33 and R34–37, for biasing the sensor assembly IR LEDs 32E. Four 430 ohm, ½ watt, resistors are connected in parallel in order to provide for a maximum current level of approximately 100 mA separately. Since this relatively high current level is often not required, resistors can be removed or selectively disconnected in any suitable manner in order to reduce the drive levels and consequently extend the life of batteries used for powering the chronograph 10. The range of IR LED bias levels depends on the size of the apertures $A_p$, which can be from 2 to 6 inches as described above, the type of IR LEDs 32E used, and the sensitivity of the phototransistors 32D. The IR LED bias currents are manually switched so that they can be turned on only during the time that a velocity measurement is to be made.

As also shown in FIG. 10, the power supply 46 produces positive and negative 12-volt DC outputs selectively by a DPDT switch SW3 from a pair of 12-volt batteries or from a pair of DC power regulators 56 that can be connected to a source of utility power such as 117-volt 60 Hz AC. The power supply 46 includes conventional polarity protection diodes and status indicators as shown in FIG. 10. The bias network 45 powers the IR LEDs 32E from the positive and negative 12-volt outputs, respectively, of the power supply 46.

The delay test circuit 47 facilitates compensation of differential timing errors as described herein. There is no assurance that propagation times are equal in the detector circuits 19A and 19B from the drop in photocurrent resulting from the interruption of a beam to the application of the clock pulses being applied to the counter 42. The circuit 47 provides for determining the relative propagation delays between the two sensor assemblies 16. This is accomplished by applying a 15 μs wide pulsed 10 ohm load simultaniously across both IR LED photoemitters 32E. More particularly, cascaded edge-triggered flip-flops U3A and U3B produce complementary pulsed outputs Q and $\overline{Q}$ in response to manual operation of a momentary set switch SW4. The flip-flop U3A operates as a manually triggered denounce flip-flop which triggers the flip-flop U3B, U3B being connected as a 15 μs one-shot multivibrator (OSM). Thus only a single pulse is applied to the IR LEDs 32E in response to operation of the set switch SW4.

The OSM provides the complementary base drive to respective NPN and PNP transistor inverters Q4 and Q5 that are used as switches to connect the 10 ohm loads across the IR LEDs 32E. In the pretriggered rest state both U1A-Q and U1B-Q are low, (0). When the SET push-button switch is depressed, the clock input to U1A goes high, the 0–1 transition setting the Q output of U1B high since the D input is wired high. This in turn sets U1B-Q high causing the voltage at the R input of U1B to rise exponentially. When the voltage crosses the 0–1 threshold for the R input of U1B, the flip-flop resets itself. The flip-flop U3A is reset by depressing the momentary reset switch SW5. The outputs Q and $\overline{Q}$ are AC coupled to respective complementary inverters Q4 and Q5 for pulse-connecting respective 10 ohm shunt resistors R11 and R12 to ground. The IR LEDs 32E have effective resistances of approximately 1 ohm. Thus the pulsed connection of the shunt resistors R11 and R12 produces an approximate 10% drop in photocurrent, being approximately 1 db. Since the IR emitters 32E are pulse-loaded simultaneously, any difference in delay between the forward and aft sensor should appear as an accumulated count of the counter 42 of the CCU 20. If a count is observed, then the equivalent time is subtracted from the total time observed for each of the subsequent velocity measurements. If a zero value count is observed, then the two sensor assembly SQ/$\overline{SQ}$ signal cables 51 are interchanged and the measurement is made again. If a count is observed using the interchanged connection, then the equivalent time is added to the total time observed for each of the subsequent velocity measurements. The cables 51 are subsequently restored to their original connections on the clock/counter assembly. The test circuit 47 also provides a means of verifying the transient response of the photodetector electronics by limiting the pulse width of the "blanking" to approximately 15 μs.

The errors attributable to the chronograph 10 of the present invention may be summarized for the case of 3000 fps as follows:

Absolute frequency error, ±0.01%;
Time quantization error, ±0.06%;
Muzzle velocity estimation error, ±0.13%;
Beam orthogonality error, ±0.021%;
Beam spacing measurement error, ±0.033%.

The computed RMS error is ±0.073%, or ±0.219 fps. Thus the present invention provides particularly accurate determinations of projectile velocities. Further, even greater precision is provided regarding repeatability, which is of paramount concern to many potential users of the chronograph 10. Moreover, further improved accuracy is available to those having ordinary skill in the art in accordance with the above description, such as by increasing the spacing S and/or by increasing the frequency of the clock circuit 40.

Although the present invention has been described in considerable detail with reference to certain preferred versions thereof, other versions are possible. For example, the counter 42 can be provided with a suitably scaled divider circuit and digital display for providing a direct readout of projectile velocity. Therefore, the spirit and scope of the appended claims should not necessarily be limited to the description of the preferred versions contained herein.

What is claimed is:

1. Apparatus for measuring the velocity of a projectile, comprising:

(a) a base for placement in spaced relation to a ballistic path to be traversed by the projectile;

(b) first and second sensor units spaced longitudinally on the base for sequentially responding to passage of the projectile, each of the sensor units comprising a facing pair of first and second parabolic slit mirrors supported on opposite sides of the ballistic path, a radiation source supported at a focal point of the first mirror for directing radiation against the first mirror and a radiation detector supported at a focal point of the second mirror, the radiation being approximately collimated by the first mirror, at least a portion of the radiation being redirected and focused onto the radiation detector by the second mirror, a portion of the radiation onto the detector being interrupted by passage of the projectile between the mirrors; and (c) a circuit responsive to the detectors for determining a measured quantity being a function of an average velocity of the projectile between the sensor units.

2. The apparatus of claim 1, wherein for each of the sensor units each of the parabolic mirrors has an optical axis, the optical axes being coaxially aligned and laterally spaced outside of the ballistic path.

3. The apparatus of claim 1, wherein the second mirror and the radiation detector are supported within an opaque detector housing, the housing defining a rectangular entrance aperture for passing the collimated light, the housing forming a light shield for preventing ambient light from reaching the detector other than through the entrance aperture.

4. The apparatus of claim 3, wherein internal surfaces of the detector housing are finished for preventing reflection of stray radiation onto the detector.

5. The apparatus of claim 1, wherein the first mirror and the radiation emitter are supported between facing opaque first side walls, an exit aperture being defined between the side walls for passing the collimated light, the first side walls being connected in a light shield structure for preventing ambient light from entering between the side walls other than through the exit aperture.

6. The apparatus of claim 5, wherein portions of the facing side walls between the emitter and the first mirror have reflective surfaces for augmenting radiation from the emitter being reflected by the first mirror and passing through the aperture.

7. The apparatus of claim 5, wherein the entrance and exit apertures of the sensor units have respective widths being not more than 1 percent of a longitudinal spacing between the sensor units.

8. The apparatus of claim 7, wherein the entrance aperture widths are less than 0.5 percent of the longitudinal spacing.

9. The apparatus of claim 5, wherein the first sidewalls are planar, being closely spaced on opposite sides of the radiation source.

10. The apparatus of claim 1, wherein the circuit includes, for each of the radiation detectors, a detector amplifier comprising:
(a) a comparator stage having a comparator input responsively connected to the detector and a reference input connected to a voltage reference, and a comparator output;
(b) a triggerable element connected for response to the comparator output, the determination of the measured quantity being in response to operation of the triggerable element;
(c) a biasing element for loading the comparator input; and
(d) a bias feedback stage having an input responsively connected to the first gain output and a linear voltage output, the voltage output feeding an active feedback element of the bias feedback stage for variably coupling the biasing element to the comparator input, whereby the loading of the comparator input variably compensates for variations in ambient radiation reaching the radiation detector.

11. The apparatus of claim 10, wherein the biasing element is adjustable for correspondingly varying a quiescent level of the voltage output, thereby to effect a desired operating point of the active feedback element.

12. The apparatus of claim 10, wherein the linear voltage output is accessible for facilitating identification of a reference plane of the associated detector.

13. The apparatus of claim 1, wherein each radiation emitter is electrically interruptible, the circuit having a variable offset element to which the measured quantity is responsive, the circuit being operable for simultaneously momentarily interrupting the emitters in a calibration sequence wherein adjustment of the offset element is effective for canceling propagation delay skew of the circuit downstream of the radiation emitters.

14. The apparatus of claim 13, wherein the measured quantity is a time interval between the interruptions of the radiation onto the detectors by the projectile, and the offset element is adjustable to produce a null measurement of the time interval in the calibration sequence.

15. The apparatus of claim 14, wherein the circuit further comprises means for computing the average velocity as a scaled reciprocal of the measured quantity.

16. The apparatus of claim 1, further comprising means for determining projectile path deviations between plural measured projectiles.

17. The apparatus of claim 16, wherein the means for determining projectile path deviations comprises a clamp for supporting a target plate orthogonally intersecting the ballistic path.

18. The apparatus of claim 16, wherein the clamp is located in spaced relation to the second sensor unit opposite the first sensor unit.

19. Apparatus for measuring the velocity of a projectile, comprising:
(a) a base for placement in spaced relation to a ballistic path to be traversed by the projectile;
(b) first and second sensor units spaced longitudinally on the base for sequentially responding to passage of the projectile, each of the sensor units comprising:
(i) a facing pair of first and second parabolic slit mirrors supported on opposite sides of the ballistic path, a radiation source supported at a focal point of the first mirror for directing radiation against the first mirror and a radiation detector supported at a focal point of the second mirror, the radiation being approximately collimated by the first mirror, at least a portion of the radiation being redirected and focused onto the radiation detector by the second mirror, a portion of the radiation onto the detector being interrupted by passage of the projectile between the mirrors;
(ii) the second mirror and the radiation detector being supported within an opaque detector housing, the housing defining a rectangular entrance aperture for passing the collimated light, the housing forming a light shield for preventing ambient light from reaching the detector other than through the entrance aperture, internal surfaces of the detector housing being finished for preventing reflection of stray radiation onto the detector;
(iii) the first mirror and the radiation emitter being supported between facing opaque first side walls, an exit aperture being defined between the side walls for passing the collimated light, the first side walls being connected in a light shield structure for preventing ambient light from entering between the side walls other than through the exit aperture; and
(iv) the entrance and exit apertures of the sensor units having respective widths being not more than 0.5 percent of a longitudinal spacing between the sensor widths;
(c) a circuit responsive to the detectors for determining a measured quantity being a function of an average velocity of the projectile between the sensor units; and
(d) means for determining projectile path deviations, comprising a clamp for supporting a target plate orthogonally intersecting the ballistic path for determining projectile path deviations between plural measure projectiles.

20. A method for calibrating a ballistic chronograph, comprising the steps of:

(a) providing an assembly including a spaced pair of sensor units, each sensor unit having a radiation emitter and sensor, respective optical paths between the emitters and detectors intersecting a ballistic path for being sequentially interrupted by a projectile, the radiation emitters being electrically activated in response to an external signal;

(b) providing a timer for measuring a time interval between sequential interruptions of the optical paths in response to signals from the detectors, thereby to produce a measured function of an average velocity of the projectile;

(c) simultaneously electrically interrupting the activation of the emitters for producing a test interval output of the emitters and a corresponding test output of the timer; and (d) offsetting a subsequently measured time interval being responsive to the projectile negatively by the test interval output for producing a corrected measured function of the average projectile velocity.

21. The method of claim 20, comprising the further steps of:

(a) determining whether the test output of the timer is zero; and (b) if so:
  (i) interchanging connections between the detectors and the timer;
  (ii) repeating the step of interrupting for producing a new test output;
  (iii) restoring the connections between the detectors and the timer; and
  (iv) using the new test output oppositely in the step of offsetting.

22. The method of claim 20, wherein each optical path has a thickness in the direction of the ballistic path, the method comprising the further steps of:

(a) providing a rod having a thickness being less than the thickness of each optical path;

(b) generating for each of the sensors a non-saturated test signal;

(c) holding the rod oriented perpendicular to the ballistic path;

(d) moving the rod in the direction of the ballistic path between opposite sides of each optical path for partially blocking the optical paths;

(e) during the step of moving the rod, monitoring the test signal corresponding to the light path being interrupted;

(f) determining respective locations of the rod in the direction of the ballistic path corresponding to maximum blockage of the optical paths at corresponding singularities of the test signals; and (g) measuring a distance between the locations in the direction of the ballistic path.

\* \* \* \* \*